(12) United States Patent
Watanabe

(10) Patent No.: US 6,404,597 B1
(45) Date of Patent: Jun. 11, 2002

(54) MAGNETIC HEAD DEVICE WITH FEATURE PROTECTING A CONDUCTIVE WIRE EXTENDING TO A MAGNETIC CORE

(75) Inventor: Masaharu Watanabe, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 5 days.

(21) Appl. No.: 09/605,710

(22) Filed: Jun. 27, 2000

(30) Foreign Application Priority Data

Jun. 29, 1999 (JP) ............................................ 11-184151

(51) Int. Cl.[7] .................................................. G11B 5/48
(52) U.S. Cl. ..................................... 360/271.5; 360/281
(58) Field of Search ............................ 360/271.5, 281.7

(56) References Cited

U.S. PATENT DOCUMENTS 5,999,376 A * 12/1999 Nakano ................... 360/281.7
6,014,286 A * 1/2000 Tsutaki .................... 360/271.5

FOREIGN PATENT DOCUMENTS

JP 8-102008 4/1996

* cited by examiner

Primary Examiner—A. J. Heinz
(74) Attorney, Agent, or Firm—Whitham, Curtis & Christofferson, P.C.

(57) ABSTRACT

A core chip includes a magnetic core having a magnetic gap and a coil formed around the magnetic core. A head base includes a first main face on which a wiring pattern is formed, and a second main face on which the core chip is mounted. A conductive wire derived from the coil is electrically connected by extending only via the first main face. One end portion of the first main face is slanted and the core chip is mounted on the one end portion of the second main face. A recess or a slit is formed on the slanted portion of the first main face to extend the conductive wire therein.

9 Claims, 3 Drawing Sheets

MAGNETIC HEAD DEVICE WITH FEATURE PROTECTING A CONDUCTIVE WIRE EXTENDING TO A MAGNETIC CORE

BACKGROUND OF THE INVENTION

The present invention relates to a magnetic head device in which a core chip is mounted on a head base. More particularly, the invention relates to a magnetic head device in which a coil of a core chip is electrically connected to a head base.

In a video head of the rotary drum type used in a video deck, a plurality of magnetic head devices are mounted on a rotating drum. Each magnetic head device includes a core chip provided with a magnetic core and coil, and a head base supporting the core chip. A related magnetic head device is shown in FIG. 5. In the magnetic head device shown in FIG. 5, a core chip 101 is disposed on one end of the head base 100. The core chip 101 includes a magnetic core 102 and a coil 103 wound around the magnetic core 102. A lead wire 104 is derived from the coil 103.

A wiring pattern 105 is formed on one main face of the head base 100. The lead wire 104 derived from the coil 103 is electrically connected to the wiring pattern 105.

In the magnetic head device, the wiring pattern 105 is disposed on one of the main faces of the head base 100, while the core chip 101 is disposed on the other main face of the head base 100. The lead wire 104, as shown in FIG. 6, is led from the coil 103 to the one main face by way of the other main face. The lead wire 104 is connected to the wiring pattern 105 on the one of the main faces of the head base 100.

In the above-mentioned magnetic head device, to protect the lead wire 104 derived from the coil 103, a resin 106 is formed on both the main faces of the head base 100, while covering the lead wire 104. That is, the resin 106 covers the lead wire 104 to prevent the lead wire 104 from being disconnected or corroded.

In the magnetic head device, to form the resin 106, the workability is poor, and hence the productivity is also poor. Even if the resin 106 is formed, the lead wire can be disconnected since the lead wire 104 is located at both the main faces.

SUMMARY OF THE INVENTION

It is therefore an object of the present invention to provide a magnetic head device which provides a reliable leading of the lead wire derived from the coil and reliably prevents the disconnection and corrosion of the lead wire.

In order to achieve the above object, according to the present invention, there is provided a magnetic head device comprising:

a core chip including a magnetic core having a magnetic gap and a coil formed around the magnetic core; and a head base including a first main face on which a wiring pattern to which a conductive wire derived from the coil is electrically connected is formed, and a second main face on which the core chip is mounted.

One end portion of the first main face is slanted and the core chip is mounted on the one end portion of the second main face. A recess or a slit is formed on the slanted portion of the first main face to pass the conductive wire therein.

In the thus constructed magnetic head device, the conductive wire derived from the coil of the core chip is led out and passes through the recess or the slit to be connected to the wiring pattern. It is noted that in the magnetic head device, the conductive wire is connected to the wiring pattern not by way of the second main face. It is noted further that in the magnetic head device, the conductive wires pass through the recess or slit. With this structure, the influence of accidental impact from outside (upon the conductive wire is reduced.

DETAILED DESCRIPTION OF THE PREFERRED EMBODIMENTS

The preferred embodiments of a magnetic head device according to the present invention will be described in accordance with the accompanying drawings.

Figure 1:
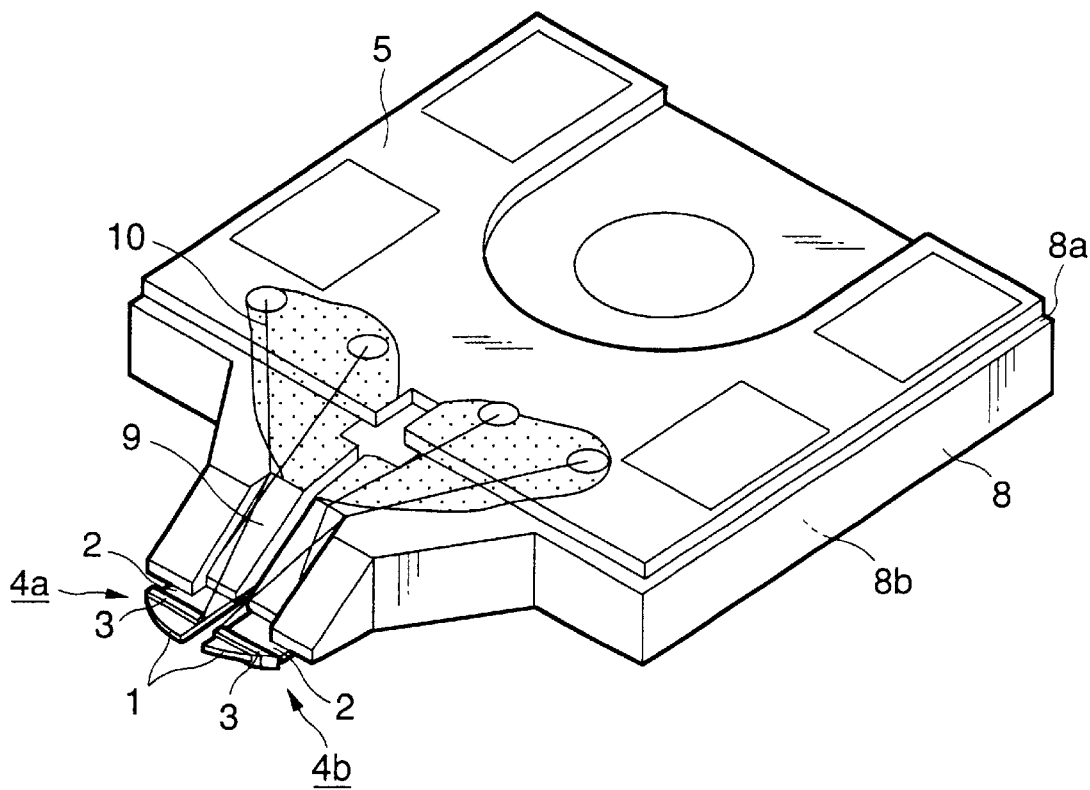
FIG. 1 is a perspective view showing an essential portion of a magnetic head device according to a first embodiment of the present invention.
Figure 2:
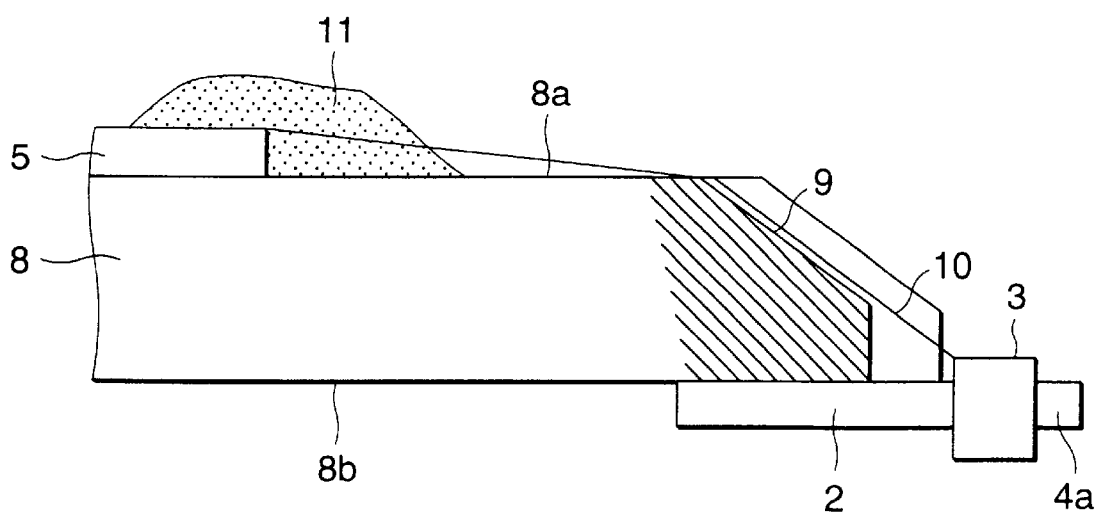
FIG. 2 is a cross sectional view showing the magnetic head device shown in FIG. 1.

A magnetic head device according to a first embodiment of the invention, as shown in FIGS. 1 and 2, includes a pair of core chips 4a and 4b each consisting of a magnetic core 2 with a magnetic gap 1, which is wound by a coil 3, and a head base 8 having a wiring pattern electrically connected to the coils 3 of the core chips 4a and 4b. In the magnetic head device, the head base 8 is fastened to a rotary drum, not shown. In the magnetic head device, the wiring pattern is located on one (referred to as a first main face) 8a of the main faces of the head base 8. The core chips 4a and 4b are located on one end portion of the other one (referred to as a second main face) 8b of the main faces of the head base 8.

In the magnetic head device, the one end portion of the head base 8 on which the core chips 4a and 4b are disposed is slanted toward the core chips 4a and 4b to have a slanted face. A recess 9 of a predetermined depth is formed in the slanted face.

In the magnetic head device, a pair of lead wires 10 are derived from each coil 3 of the core chips 4a and 4b, respectively. In the magnetic head device, the number of the lead wires 10 derived therefrom are four in total. Those lead wires 10 are derived from the first main face 8a of the head base 8 in a state that the core chips 4a and 4b are disposed. Those lead wires 10 are led out through the recess 9 and connected to the wiring pattern 5.

Also in the magnetic head device, a protecting resin 11 is formed covering a portion thereof where the lead wires 10 are connected to the wiring pattern 5. Namely, the portions of the lead wires 10, which are connected to the wiring pattern 5, are covered with the protecting resin 11.

In the thus constructed magnetic head device, the lead wires 10 derived from the coils 3 are led out through the recess 9. Namely, in the magnetic head device, the lead wires 10 are connected to the wiring pattern 5 not by way of the second main face 8b of the head base 8. For this reason, it suffices that the protecting resin for protecting the lead wires 10 is formed only on the first main face 8a of the head base 8.

Thus, in the magnetic head device, there is no need of forming the protecting resin 11 on the second main face 8b of the head base 8. In this respect, the workability in manufacturing the magnetic head device is remarkably improved. Further, the magnetic head device may easily be fastened to the rotary drum or the like since the protecting resin 11 is not present on the second main face 8b of the head base 8.

Also in the magnetic head device, the lead wires 10 are led out while being surrounded within the recess 9. Namely, the lead wires 10 are only partially exposed to the outside within the recess 9. Therefore, there is less chance that within the recess 9, the lead wires 10 will be influenced by accidental impacts and the like from outside. Accordingly, there is no need to cover them with resin or the like. For this reason, in the magnetic head device, the lead wires 10 may be led out to the first main face 8a of the head base 8, while being free from disconnection of them. Thus, in the magnetic head device, a total of four lead wires 10 may be led out to the first main face 8a of the head base 8. As a result, the connection of the lead wires 10 to the wiring pattern 5 is easy, and this leads to remarkable enhancement in productivity.

Figure 3:
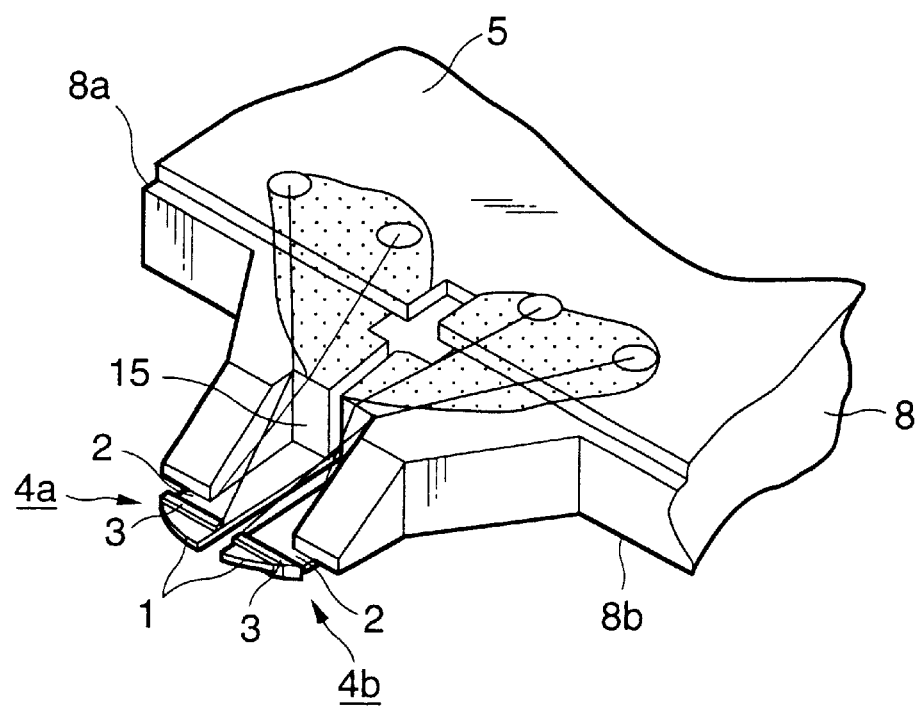
FIG. 3 is a perspective view showing an essential portion of a magnetic head device according to a second embodiment of the invention.
Figure 4:
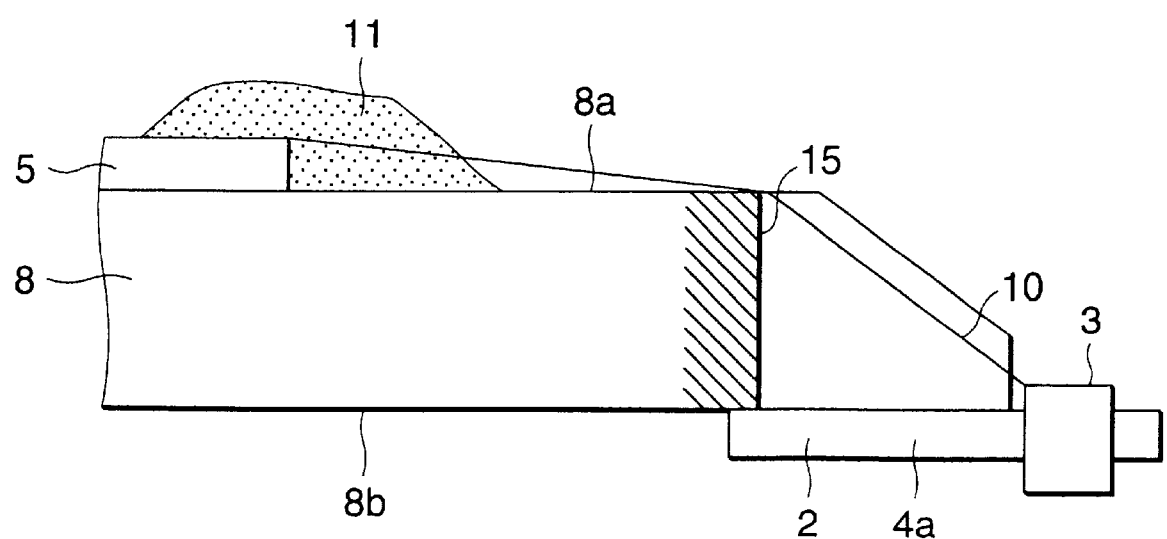
FIG. 4 is a cross sectional view showing the magnetic head device shown in FIG. 3.
Figure 5:
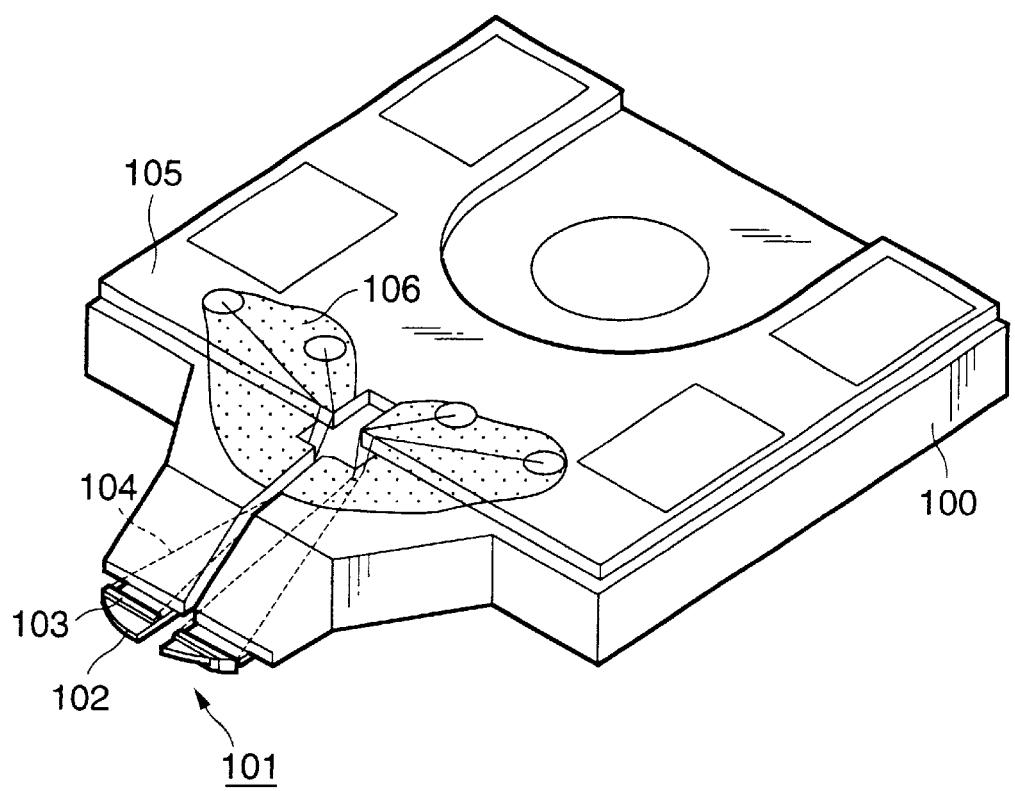
FIG. 5 is a perspective view showing an essential portion of a related magnetic head device.
Figure 6:
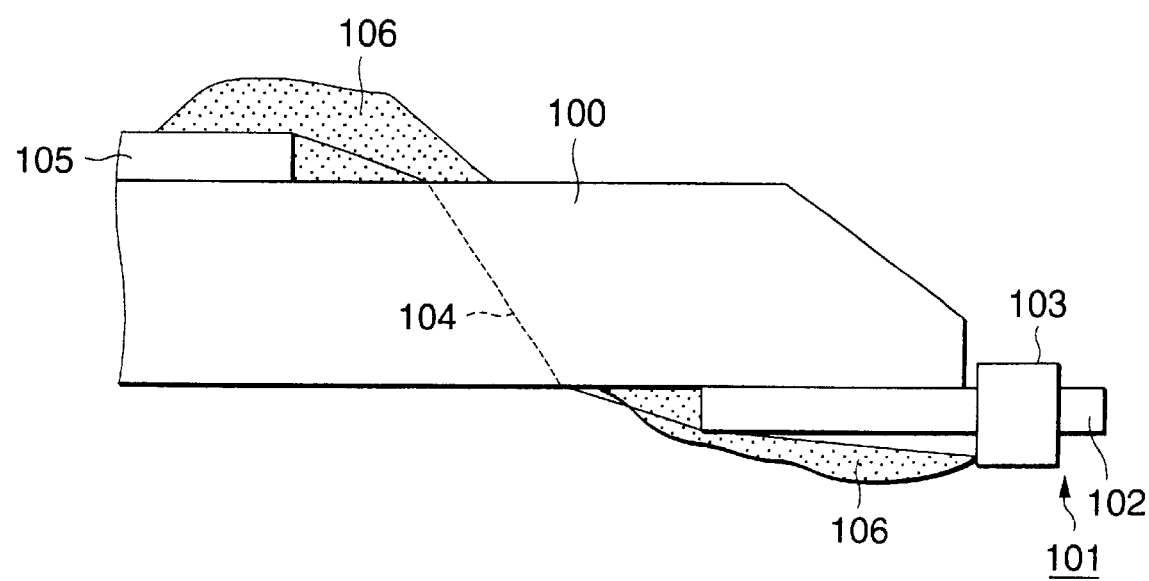
FIG. 6 is a cross sectional view showing the related magnetic head device.

The magnetic head device of the invention is not limited to the one as shown in FIGS. 1 and 2, but may be a magnetic head device as shown in FIGS. 3 and 4.

In the magnetic head device according to a second embodiment shown in FIGS. 3 and 4, a slit 15 is formed in the slated face of the one end portion of the head base 8. In the magnetic head device, the lead wires 10 derived from the coils 3 are led out through the slit 15. The lead wires 10, after passing through the slit 15, are connected to the wiring pattern 5.

Also in the thus constructed magnetic head device, the lead wires 10 are connected to the wiring pattern 5 while not by way of the second main face 8b of the head base 8. For this reason, in the magnetic head device, it suffices that the protecting resin 11 is formed on only the first main face 8a of the head base 8 in order to protect the lead wires 10.

Thus, in the magnetic head device, there is no need of forming the protecting resin 11 on the second main face 8b. As a result, the workability in manufacturing the magnetic head device is considerably improved. Further, the magnetic head device may easily be fastened to the rotary drum or the like since the protecting resin 11 is not formed on the second main face 8b of the head base 8.

In the magnetic head device. the lead wires 10 are led out while being surrounded within the slit 15. Namely, the lead wires 10 are only partially exposed to the outside within the slit 15. Therefore, there is less chance that the lead wires 10 within the slit 15 will receive an accidental impact from the outside. Accordingly, there is no need to cover them with resin or the like. For this reason, in the magnetic head device, the lead wires 10 may be led out to the first main face 8a of the head base 8 while being free from disconnection from them. Thus, in the magnetic head device, a total of four lead wires 10 may be led out to the first main face 8a of the head base 8. As a result, the connection of the lead wires 10 to the wiring pattern 5 is easy, leading to a remarkable enhancement in productivity.

As seen from the foregoing description, in the magnetic head device of the present invention, the conductive wires derived from the coils of the core chips are led out through the recess or the slit and connected to the wiring pattern. That is, in this magnetic head device, the conductive wire is connected to the wiring pattern while not by way of the other one of the main faces of, the head base. Also in the magnetic head device, accidental impact and the like applied to the conductive wires from external are lessened since the conductive wires pass through the recess or the slit. Accordingly, the invention may reliably lead out the conductive wires derived from the coils, completely prevent disconnection and corrosion of the conductive wires, and provide a magnetic head device having good productivity in its manufacturing.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A magnetic head device comprising:
   a core chip including a magnetic core having a magnetic gap and a coil formed around the magnetic core;
   a head base including a first main face on which a wiring pattern is formed and a second main face on which the core chip is mounted;
   a conductive wire derived from the coil which is electrically connected to the wiring pattern by extending only via the first main face; and
   a recess formed on one end portion of the first main face extending between the wiring pattern and the coil, the recess capable of accommodating more than one conductive wire at different conductive wiring positions.

2. The magnetic head as set forth in claim 1, wherein the one end portion of the first main face is slanted and the core chip is mounted on the one end portion of the second main face; and
   wherein the recess surrounds the conductive wire.

3. The magnetic head as set forth in claim 1 wherein a resin is formed on the first main face to cover the conductive wire.

4. The magnetic head as set forth in claim 1, wherein a resin is formed on the first main face to cover the conductive wire.

5. The magnetic head device as set forth in claim 1, wherein the recess has a width wide enough to change an extending angle of each conductive wire therein.

6. A magnetic head device comprising:
   a core chip including a magnetic core having a magnetic gap and a coil formed around the magnetic core;
   a head base including a first main face on which a wiring pattern is formed and a second main face on which the core chip is mounted;
   a conductive wire derived from the coil which is electrically connected to the wiring pattern by extending only via the first main face;
   one end portion of the first main face is slanted to have a slanted portion and the core chip is mounted on the one end portion of the second main face; and
   a slit piercing the head base from the slanted portion of the first main face to the second main face to extend the conductive wire therein.

7. The magnetic head as set forth in claim 6 wherein a resin is formed on the first main face to cover the conductive wire.

8. The magnetic head device as set forth in claim 6, wherein the slit has a width wide enough to change an extending angle of the conductive wire therein.

9. The magnetic head device as set forth in claim 6, wherein the slit accommodates more than one conductive wire at different conductive wire positions.

* * * * *